United States Patent [19]

Grey et al.

[11] Patent Number: 5,192,562
[45] Date of Patent: Mar. 9, 1993

[54] METHOD OF MANUFACTURING A CHEWING GUM

[75] Inventors: Ronald T. Grey, Chicago; Mansukh M. Patel, Downers Grove; Charles M. Copper, Willowbrook, all of Ill.

[73] Assignee: Wm. Wrigley Jr. Company, Chicago, Ill.

[21] Appl. No.: 912,225

[22] Filed: Jul. 10, 1992

Related U.S. Application Data

[63] Continuation of Ser. No. 800,560, Nov. 27, 1991, abandoned, which is a continuation-in-part of Ser. No. 568,462, Aug. 16, 1990, Pat. No. 5,085,872.

[51] Int. Cl.$^5$ .............................................. A23G 3/30
[52] U.S. Cl. ............................................. 426/4; 426/6
[58] Field of Search ........................................ 426/3-6

[56] References Cited

U.S. PATENT DOCUMENTS

| | | | |
|---|---|---|---|
| 1,807,704 | 6/1931 | Pappadis | 426/3 |
| 3,984,574 | 10/1976 | Comollo | 426/4 |
| 4,352,823 | 10/1982 | Cherukuri et al. | 426/5 |
| 4,387,108 | 6/1983 | Koch et al. | 426/4 |
| 4,415,593 | 11/1983 | Glass et al. | 426/4 |
| 4,452,820 | 6/1984 | D'Amelia et al. | 426/3 |
| 4,518,615 | 5/1985 | Cherukuri et al. | 426/4 |
| 4,794,003 | 12/1988 | Cherukuri et al. | 426/6 |
| 4,808,418 | 2/1989 | Tena | 426/5 |
| 4,889,726 | 12/1989 | Dave et al. | 426/3 |
| 4,889,727 | 12/1989 | Dave et al. | 426/3 |
| 5,085,872 | 2/1992 | Patel et al. | 426/4 |

FOREIGN PATENT DOCUMENTS 0271445 4/1987 European Pat. Off. .
55-19014 6/1986 Japan .

*Primary Examiner*—Jeanette Hunter
*Attorney, Agent, or Firm*—Willian Brinks Olds Hofer Gilson & Lione

[57] ABSTRACT

A method of manufacturing a chewing gum is disclosed wherein a first mixing step mixing an amount of either a low fat gum base or a non-tack gum base having a premix temperature of about 200°–240° F., an amount of HFO gum base having a temperature of about 60°–80° F. and a portion of the bulking agents are mixed until homogenous. In a final mixing step, the resulting gum base blend is mixed with an amount of flavor and the remaining portion of the bulking agent.

19 Claims, No Drawings

METHOD OF MANUFACTURING A CHEWING GUM

This application is a continuation of Ser. No. 07/800,560, filed Nov. 27, 1991 now abandoned which is a continuation-in-part of application Ser. No. 07/568,462, for a METHOD OF MANUFACTURING A CHEWING GUM BASE, filed Aug. 16, 1990, now U.S. Pat. No. 5,085,872.

BACKGROUND OF THE INVENTION

Chewing gums utilizing gum base having a high fat and/or oil content (hereafter "HFO" gum base) manifest non-tack properties. See, for example, U.S. Pat. No. 3,984,574. However, the texture, stability and flavor of chewing gums incorporating HFO gum base is somewhat less desirable than that of chewing gums incorporating conventional low fat gum base. A chewing gum that exhibits the non-tack properties of chewing gums incorporating HFO base, and the texture, stability and flavor properties of chewing gums incorporating conventional low fat bases, is highly desirable.

SUMMARY OF THE PRESENT INVENTION

It has been surprisingly discovered that chewing gum utilizing HFO gum base made according to the method of the present invention requires less mixing time and results in a more complete incorporation of the HFO gum base into the final gum product.

The present invention is directed to a novel method of making a chewing gum utilizing an HFO gum base. In one feature of the present invention, an amount of HFO gum base having a premix temperature of about 60°-80° F., an amount of conventional low fat gum base having a premix temperature of about 200°-240° F. and an amount of bulking agent are mixed in a first mixing step to yield a gum base blend. In a final mixing step the gum base blend is mixed with the flavor and a further amount of bulking agent.

Preferably, the HFO gum base comprises about 5-30 wt % filler, about 10-40 wt % low molecular weight polyvinyl acetate, about 20-40 wt % elastomer, and 20-50 wt % of a component selected from the group consisting of fats, oils and mixtures thereof. The low fat gum base comprises about 10-50 wt % elastomer, about 10-50 wt % resin, about 1-15 wt % wax, about 5-50 wt % filler, and about 1-15 wt % of component selected from the group consisting of fats, oils and mixtures thereof.

More preferably, the bulking agent is selected from the group consisting of sugar sweeteners, sugarless sweeteners and mixtures thereof. Even more preferably, other chewing gum ingredients are mixed with the gum base blend subsequent to the first mixing step and prior to the final mixing step. The chewing gum ingredients are preferably selected from the group consisting of softeners such as glycerin, sweeteners, syrups, flavoring agents, colors, emulsifiers, pharmaceutical agents and mixtures thereof.

Most preferably, about 30-60 wt % of the total bulking agent contemplated for use in the final gum product is added in the first mixing step and mixed about 2-5 minutes. Optionally, an amount of dextrose monohydrate bulking agent is mixed with the gum base blend in the first mixing step. Thereafter, the gum base blend is mixed for about 0.5-1.5 minutes with a component selected from the group consisting of softeners, sweeteners and mixtures thereof. Then, another 20-40 wt % of the total bulking agent is mixed with the gum base blend for about 1.5-2.5 minutes. In a final mixing step, the gum base blend is then mixed with the flavor and any remaining portion of bulking agent for about 4-5 minutes.

In another feature of the present invention, a non-tack gum base may be used in place of the low fat gum base. Preferably, the non-tack base comprises about 1-20 wt % high melting wax; terpene resin in an amount up to about 40 wt %, low melting wax in an amount up to about 4 wt %, about 1-15 wt % oil, low molecular weight polyvinyl acetate in an amount up to about 40 wt %, about 0.5-50 wt % inorganic filler, lecithin in an amount up to about 5 wt %, polyisobutylene in an amount up to about 20 wt %, and isoprene-isobutylene copolymer in an amount up to about 20 wt %.

Manufacturing a chewing gum according to the present invention results in a reduced mixing time and eliminates the need to thoroughly premix the HFO gum base. Furthermore, the method of the present invention reduces the possibility of the non-incorporation of the HFO base into the final gum product.

DETAILED DESCRIPTION OF THE PREFERRED EMBODIMENTS

The invention of application Ser. No. 07/568,462, from which this application is a continuation-in-part, is directed to a novel method of manufacturing a chewing gum utilizing HFO gum base. In one feature of the invention disclosed in Ser. No. 07/568,462, a HFO gum base is cold blended with a conventional low fat gum base. In another feature of that invention, a HFO gum base is cold blended with a non-tack gum base. The invention of application Ser. No. 07/568,462 is further directed to a method of manufacturing a chewing gum wherein, once the gum bases have been preblended, other chewing gum ingredients are mixed with the gum base blend.

Although resulting in a very desirable chewing gum, the method disclosed in Ser. No. 07/568,462 may be improved upon. In particular, the mixing time required to make the chewing gum of Ser. No. 07/568,462 can last for up to 17 minutes or more. Certainly, a reduced mixing time would be more conducive to large-scale manufacture. Also, pursuant to the process disclosed in Ser. No. 07/568,462, there is the potential that the cold HFO base may not be completely mixed into the molten conventional low fat gum base or molten non-tack gum base in the preblending step and therefore, the HFO gum base is not completely incorporated into the final chewing gum product.

In accordance with the present invention, a method of making a chewing gum utilizing HFO gum base is provided. As discussed above, an HFO (i.e. high fat and/or oil) base is high in fat and/or oil, and comprises about 20-50 wt % of a component selected from the group consisting of fats, oils and mixtures thereof. The method of this invention entails a reduced mixing time. Moreover, according to the method of this invention, the HFO gum base is more completely incorporated into the final chewing gum product. The resulting chewing gum has non-tack properties and improved texture, stability and flavor as compared to non-tack chewing gums that do not utilize HFO gum base.

In one embodiment of the present invention, an amount of HFO gum base is cold blended with conventional low fat gum base having a premix temperature of about 200°-240° F. and an amount of the bulking agent. By cold blended it is meant that HFO gum base has a temperature of about 60°-80° F. prior to mixing with the bulking agent and the molten low fat gum base. All temperatures are at one atmosphere of pressure. Without being restricted thereto, it is theorized that the fat and oil in the HFO gum base degrades at elevated temperatures. Thus, if the HFO gum base is exposed to elevated temperatures and subsequently used in chewing gum, the gum may have a shortened shelf-life, as well as an undesirable rancid taste due to the degradation of the fat or oil in the HFO base. Conversely, at lower temperatures the HFO gum base is in pellet form and may not be sufficiently soft for mixing with the molten low fat gum base. Inadequate blending of the HFO gum base results, of course, in the less than complete incorporation of the HFO base into the final gum product. This results in a gum product which is inferior to one wherein the HFO base is completely incorporated.

It has surprisingly been discovered that by first mixing an amount of the HFO gum base having a premix temperature of about 60-80° F., an amount of either a low fat gum base or non-tack base having a premix temperature of about 200-240° F. and a portion of the bulking agent, the problem of thermal degradation of the oil and fat in the HFO base is avoided. Moreover, the HFO gum base is more completely blended with either the low fat or non-tack gum base, ultimately resulting in a more complete incorporation of the HFO gum base into the final chewing gum product.

In one embodiment of the present invention, an amount of HFO gum base having a premix temperature of about 60°-80° F., an amount of low fat gum base having a premix temperature of about 200°-240° F. and a portion of the total bulking agent are mixed in a first mixing step such that the resulting gum base blend comprises a weight ratio of HFO gum base to low fat base of about 1:50-1:1. Preferably, the weight ratio of HFO gum base to low fat base is about 1:19-2:3. Most preferably, the resulting gum base blend will comprise a weight ratio of HFO gum base to low fat base of about 1:9-3:7.

In another embodiment of the present invention, an amount of HFO gum base having a premix temperature of about 60°-80° F., an amount of non-tack gum base having a premix temperature of about 200°-240° F. and a portion of the total bulking agent are mixed in a first mixing step such that the resulting gum base blend comprises a weight ratio of HFO gum base to non-tack base of about 1:50-1:1. Preferably, the weight ratio of HFO gum base to non-tack base is about 1:19-2:3. Most preferably, the wt. ratio of HFO gum base to nontack base is about 1:9-3:7.

As contemplated by the present invention, HFO gum base is defined to be a gum base having from about 20% to about 50% of a component selected from the group consisting of fats, oils and mixtures thereof. The HFO gum base may further comprise filler in an amount from about 5% to about 30% and preferably from about 10% to about 20% by weight of the HFO base; low molecular weight polyvinyl acetate (i.e. molecular weight of about 8,000 to about 60,000) from about 10% to about 40% by weight of the HFO base; elastomers in an amount from about 20% to about 40% by weight of the HFO base; and emulsifiers from about 1% to about 10% by weight of the HFO base.

Fillers contemplated for use in the HFO gum base include but are not necessarily limited to calcium carbonate, magnesium carbonate, talc, tricalcium phosphate and the like, as well as mixtures thereof. Elastomers contemplated for use in the HFO gum base include synthetic gums or synthetic elastomers. Illustrative synthetic elastomers are butadiene-styrene copolymers, polyisobutylene, and isobutylene-isoprene copolymer. Preferably, polyisobutylene, isobutyleneisoprene copolymer, or mixtures thereof are employed. Most preferably, the HFO gum base utilizes a mixture of isobutylene-isoprene copolymer and polyisobutylene wherein the ratio of isobutylene-isoprene copolymer to polyisobutylene is from about 3:1 to about 1:3 by weight. Fats and oils contemplated for use in the HFO gum base include but are not limited to hydrogenated vegetable oil, hydrogenated cottonseed oil, hydrogenated soybean oil and the like or mixtures thereof. Emulsifiers contemplated for use in the HFO gum base include glyceryl monostearate, lecithin, fatty acid monoglycerides, diglycerides, triglycerides, an the like, as well as mixtures thereof. Glyceryl monostearate is a particularly preferred emulsifier for use in the HFO base. Optionally, the HFO gum base may contain antioxidants. Suitable antioxidants include butylhydroxide anisole (BHA) and butylhydroxide toluene (BHT).

The preferred HFO gum base contemplated for use in the present invention comprises antioxidant from about 0.01% to about 0.1% by weight, and most preferably from about 0.02% to about 0.05% by weight of the HFO gum base; hydrogenated cottonseed oil in an amount from about 5% to about 20%, and most preferably from about 10% to about 15% by weight of the HFO gum base; hydrogenated vegetable oil in an amount from about 5% to about 20%, and most preferably from about 6% to about 15% by weight of the HFO gum base; hydrogenated soybean oil in an amount from about 5% to about 20%, and most preferably from about 10% to about 15% by weight of the HFO gum base; glycerol monostearate in an amount from about 0.1% to about 10%, and most preferably from about 1% to about 5% by weight of the HFO gum base; low molecular weight polyvinyl acetate in an amount from about 10% to about 40%, and most preferably from about 20% to about 30% by weight of the HFO gum base; calcium carbonate in an amount from about 5% to about 30%, and most preferably from about 10% to about 20% by weight of the HFO gum base; polyisobutylene in an amount from about 5% to about 30%, and most preferably from about 10% to about 30% by weight of the HFO gum base; and isoprene-isobutylene copolymer in an amount from about 5% to about 30%, and most preferably from about 5% to about 15% by weight of the HFO gum base.

All conventional low fat gum bases known by those skilled in the art are contemplated for use in the method of the present invention. Conventional low fat gum bases typically comprise elastomers, resins, fats and oils, waxes, softeners, and inorganic fillers Elastomers contemplated for use in the low fat gum base include but are not limited to polyisobutylene, isobutylene-isoprene copolymer, and styrene butadiene rubber, as well as natural latexes such as chicle and natural gums. Elastomers generally comprise from about 15% to about 50% by weight of the low fat gum base. Preferably, elastomers are employed in an amount from about 20% to about 40% by weight of the low fat base. Resins contemplated for use in the low fat gum base include but are not necessarily limited to polyvinylacetate, terpene resins, and elastomer solvents such as ester gums and rosin esters. Resins generally comprise from about 10% to about 50% by weight of the low fat gum base. Fats and oils may also be included in the low fat gum base, as for example, tallow, hydrogenated and partially hydrogenated vegetable oils, and cocoa butter. Conventional low fat gum bases generally comprise from about 1% to about 15% by weight fats and oils. Waxes contemplated for use in the low fat gum base include but are not necessarily limited to candelilla, paraffin, microcrystalline, and natural waxes such as beeswax and carnauba. Moreover, waxes contemplated for use in conventional low fat gum base include both those with high melting points of about 70° C. or greater and low melting points of about 30° C. to about 70° C. Waxes generally comprise from about 1% to about 15% by weight of the low fat gum base. Conventional low fat gum bases may also include filler components such as calcium carbonate, magnesium carbonate, talc, dicalcium phosphate or the like. Fillers generally comprise from about 5% to about 50% by weight of the low fat gum base. Conventional low fat gum bases typically also contain softeners, including glycerol monostearate and glycerol triacetate. Further, conventional low fat gum base may optionally contain ingredients such as antioxidants, colors, and emulsifiers. Suitable antioxidants include BHA, BHT and the like. Emulsifiers include glycerol monostearate, lecithin, fatty acid monoglycerides, diglycerides, triglycerides and the like.

In another embodiment of the present invention, the HFO gum base is cold blended with a non-tack chewing gum base and a portion of the total bulking agent. All non-tack chewing gum bases known by those skilled in the art are contemplated for use in the novel method of the present invention. Non-tack gum bases typically comprise waxes such as paraffin wax and microcrystalline wax; terpene resins; oils such as hydrogenated cottonseed oil, hydrogenated soybean oil, and hydrogenated vegetable oil; glycerol monostearate; low molecular weight polyvinyl acetate; inorganic fillers such as calcium carbonate, magnesium carbonate, talc, dicalcium phosphate, and the like; lecithin; polyisobutylene; and isoprene-isobutylene copolymer.

Preferably, the non-tack gum base contemplated for use in the present invention comprises a high melting wax and a low melting wax. By high melting wax it is meant a wax with a melting point of about 70° C. or greater. High melting waxes include candelilla wax, paraffin wax, carnauba wax, microcrystalline wax, and the like. By low melting point wax it is meant a wax with a melting point of about 50° C. or less. A preferred low melting wax for use in the present invention is a low melting paraffin wax (m.p. about 46° C.) available from Boler Petroleum Co. under the name "1397 wax".

The preferred non-tack gum base contemplated for use in the present invention comprises microcrystalline wax having a melting point of about 82° C. in an amount from about 1% to about 20%, and most preferably from about 4% to about 15% by weight of the non-tack base; terpene resin having a melting point of about 85° C. in an amount of up to about 40%, and most preferably between about 15% and about 30% by weight of the non-tack base; paraffin wax having a melting point of about 46° C. in an amount of up to about 4%, and most preferably between about 1% and about 2% by weight of the non-tack base; hydrogenated cottonseed, hydrogenated soybean, and/or hydrogenated vegetable oil in an amount from about 1% to about 15%, and most preferably from about 2% to about 10% by weight of the non-tack base; glycerol monostearate in an amount from about 0.1% to about 10%, and most preferably from about 3% to about 7% by weight of the non-tack base; low molecular weight polyvinyl acetate in an amount up to about 40% by weight, and most preferably between about 20% and 30% by weight of the non-tack base; inorganic filler in an amount from about 0.5% to about 50%, and most preferably from about 10% to about 15% by weight of the non-tack base; lecithin in an amount up to about 5%, and most preferably between about 1% and 2% by weight of the non-tack base; polyisobutylene in an amount up to about 20% and most preferably between about 2% and about 15% by weight of the non-tack base; and isopreneisobutylene copolymer in an amount up to about 20%, and most preferably from about 2% to about 15% by weight of the non-tack base.

In addition to base, chewing gum further comprises other ingredients. A chewing gum contains a water soluble bulk portion. The water-soluble bulk portion may comprise softeners, sweeteners, flavoring agents and combinations thereof. Softeners are added to the chewing gum in order to optimize the chewability and mouth feel of the gum. Softeners, also known in the art as plasticizers or plasticizing agents, generally comprise between about 0.5% to about 15.0% by weight of the chewing gum. Softeners contemplated by the present invention include glycerin, lecithin, and combinations thereof. Furthermore, aqueous sweetener solutions such as those containing sorbitol, hydrogenated starch hydrolysates, corn syrup, and combinations thereof may be used as softeners and binding agents in gum.

The method of the present invention is contemplated for use in the manufacture of either sugar-containing or sugarless gum formulations. The sweetening ingredients are what are herein referred to as "bulking agents." Sugar sweeteners generally include saccharide containing components commonly known in the chewing gum art which comprise, but are not limited to, sucrose, dextrose, maltose, dextrin, dried invert sugar, fructose, levulose, galactose, corn syrup solids and the like, alone or in any combination. Sugarless sweeteners generally include components with sweetening characteristics, but which are devoid of the commonly known sugars and comprise, but are not limited to, sugar alcohols such as sorbitol, mannitol, xylitol, hydrogenated starch hydrolysates, maltitol and the like, alone or in any combination. Additionally, high potency sweeteners may be utilized in sugar-containing, as well as sugarless gum formulations.

A flavoring agent may be present in the chewing gum in an amount from about 0.1% to about 10% by weight, and preferably from about 0.5% to about 3% by weight of the chewing gum. Flavoring agents may comprise essential oils, synthetic oils, or mixtures thereof including, but not limited to, oils derived from plants and fruits such as citrus oils, fruit essences, peppermint oil, spearmint oil, clove oil, oil of wintergreen, anise, and the like. Artificial flavoring components may also be used in chewing gums. Those skilled in the art will recognize that natural and artificial flavoring agents may be combined in any reasonably acceptable blend. All such flavors and flavor blends are contemplated by the present invention.

Optional ingredients such as colors, emulsifiers and pharmaceutical agents may be added to the chewing gum as well.

The HFO gum base and either the non-tack or conventional low fat gum base, depending on the base one desires to use, may be blended according to any method known by those skilled in the art, provided the blending occurs at temperatures between about 80° F. and about 170° F. In a preferred embodiment, however, either molten non-tack or molten low fat gum base having a premix temperature of about 200°–250° F. is added to a running mixer. The HFO base, maintained at room temperature (about 60°–80° F.) is then mixed with the molten non-tack or conventional low fat base causing the temperature of the resulting base blend to drop to about 140°–160° F. within two minutes. The base blend comprising HFO base and either non-tack base or conventional low fat base is subject to continued mixing for a period of from about 2 to about 10 minutes. Colors, emulsifiers, glycerin, and a portion of the bulking agent is then added to the base blend. Further portions of the bulking agent are added, and flavor added with the final portion. This mixing procedure takes about 7 to 17 minutes, but may take longer as those skilled in the art will recognize. Furthermore, those skilled in the art will recognize that variations to the above-described procedure may be followed.

In a more preferred embodiment of the present invention, in a first mixing step either non-tack or conventional low fat gum base—depending on the base one desires to use—having a premix temperature of about 200°–250° F. is added to a mixer. The HFO gum base having a premix temperature of about 60°–80° F. and a portion of the bulking agent, are added and the two bases and bulking agent are mixed for about 2–5 minutes to yield a gum base blend. Preferably, about 30–60 wt % of the total amount of bulking agent contemplated for use in the final gum product is added in the first mixing step. More preferably, about 35–55 wt % of the bulking agent is added in the first mixing step. The bulking agent may be sugar or more preferably a combination of sugar and dextrose monohydrate (about 3:2 wt % ratio of sugar to dextrose monohydrate). In sugarless gums, the bulking agent may comprise sugar alcohols as, for example, mannitol or sorbitol.

It is noted that when the HFO base and the bulking agent is mixed with the molten non-tack or conventional low fat base in the first mixing step it causes the temperature of the resulting base blend to drop to about 140°–160° F. within two minutes. Subsequent to the first mixing step, the additional chewing gum ingredients such as glycerin and corn syrup, may be added and mixed for an additional period of time. In a final mixing step, the flavor and the remaining bulking agent are then added. The resulting mix time is about 9–14 minutes. This procedure eliminates the need to thoroughly premix the gum base components and further eliminates any possible non-incorporation of cold base ingredient.

In a particularly preferred embodiment, either the non-tack or conventional low fat gum base—depending on the base one desires to use—having a premixing temperature of about 200°–240° F. is mixed in a first mixing step with the HFO base having a premix temperature of about 60°–80° F. and about one-third of the sugar bulking agent. The bases and the sugar bulking agent are mixed for about 1.5–2.5 minutes. After this first mixing step dextrose monohydrate is added to the base blend and mixed for about 2.5–3.5 minutes. Thereafter, syrup and glycerin are then added to the base blend and mixed for about 0.5–1.5 minutes. Thereafter, another one-third of the sugar bulking agent is added to the base blend and mixed for about 1.5–2.5 minutes. Finally, in a final mixing step the remaining one-third of the sugar bulking agent and the flavor are added to the base blend and mixed for about 4–5 minutes.

EXAMPLES

Example 1

A chewing gum having the formulation provided below was prepared by presoftening both the HFO base and the non-tack base at about 140° F.

| | |
|---|---|
| Non-tack Base[1] | 17.9% |
| HFO Base[2] | 4.4% |
| Calcium Carbonate | 2.0% |
| Dextrose Monohydrate | 13.4% |
| 43 Baume Syrup | 5.1% |
| Glycerin | 2.0% |
| Aspartame | 0.1% |
| Peppermint Flavor | 1.3% |
| Sugar | 53.8% |
| | 100.0% |

[1]The non-tack base had the following formulation: Microcrystalline wax (82° C. melting point) (11.4%); Terpene Resin (85° C. melting point) (25.8%); Paraffin wax (46° C. melting point) (1.0%); Hydrogenated cottonseed oil (3.2%); Glycerol Monostearate (4.7%); low molecular weight polyvinyl acetate (27.4%); calcium carbonate (12.4%); Lecithin (1.5%); Polyisobutylene (2.3%) and Isoprene-Isobutylene copolymer (10.3%).
[2]The HFO base had the following formulation: BHA (0.04%); Hydrogenated cottonseed oil (13.3%); Hydrogenated vegetable oil (9.9%); Hydrogenated soybean oil (13.3%); Glycerol monostearate (2.7%); Low molecular weight polyvinyl acetate (21.7%); Calcium carbonate (13.26%); Polyisobutylene (15.9%); and Isoprene-Isobutylene copolymer (9.9%).

Upon presoftening, the two bases were blended in a lab scale mixer for about 2 minutes at a temperature of about 140° F. Whereupon, the remaining chewing gum ingredients were added and mixed for a period of about 11 minutes. The resulting chewing gum had good quality texture and clean flavor. Another chewing gum having the formulation provided above can be prepared by presoftening both the HFO base and the non-tack base at about 250° F. Upon presoftening, the two bases can then be blended in a lab scale mixer for about 2 minutes at a temperature of about 250° F. Whereupon the remaining chewing gum ingredients can be added and mixed for a period of about 11 minutes. The resulting chewing gum will manifest a strong rancid, oily off-taste, which is likely attributable to the heat degradation of the HFO base.

Example 2

Chewing gum A having the formulation provided below was prepared.

| | |
|---|---|
| Non-tack Base | 16.8% |
| HFO Base | 5.5% |
| Calcium Carbonate | 2.0% |
| Dextrose Monohydrate | 13.4% |
| 43 Baume Syrup | 5.1% |
| Glycerin | 2.0% |
| Spearmint Flavor | 1.3% |
| Sugar | 53.9% |
| | 100.0% |

The non-tack base and HFO base formulations as used in Example I were used in this Example as well. The nontack gum base was added to the mixer in molten form—i.e. at a temperature of about 240° F. The HFO gum base, having a temperature of about 68° F. was then added to the mixer along with calcium carbonate. The temperature of the resulting base blend quickly equilibrated to a temperature of about 160° F. The blend of HFO base, non-tack gum base, and calcium carbonate was then mixed for about 2.5 minutes. The syrup, glycerin and first portions of sugar and dextrose monohydrate were then added to the base blend. With the addition of the second and final portion of the sugar, the flavor was added. The batch mix time was about 9 minutes.

Chewing gum B was prepared by presoftening both the HFO base and the non-tack base at about 240° F. Upon presoftening, the two bases were mixed in a pilot plant scale mixer for about 1 minute at a temperature of about 240° F. Calcium carbonate was then added and mixed for about 2 minutes. The syrup, glycerin and first portions of sugar and dextrose monohydrate were then added to the base blend. With the final portion of the sugar, flavor was added. The batch mix time was about 9 minutes.

Sensory evaluation comparing chewing gums A and B showed that gum A had clean, fresh, mint flavor whereas chewing gum B had a strong rancid, oily aftertaste, likely attributable to the heat degradation of the HFO base.

Example 3

A chewing gum having the formulation provided below was prepared:

|  |  |
|---|---|
| Non-tack Base[3] | 16.8% |
| HFO Base | 5.5% |
| Calcium Carbonate | 2.0% |
| Dextrose Monohydrate | 13.4% |
| 43 Baume Syrup | 5.1% |
| Glycerin | 2.0% |
| Spearmint Flavor | 1.3% |
| Sugar | 53.9% |
|  | 100.0% |

[3]The same non-tack base as used in previous Examples was used in this Example as well.

The HFO base used in this Example had the same formulation as in Examples 2 and 3, however, the batch used in this Example was older than in the previous examples. In fact, the HFO base used in this Example had started to manifest signs of deterioration. The non-tack base having a temperature of about 240° F. was added to the mixer. The HFO base and calcium carbonate having a temperature of about 68° F. were then added to the mixer; the resulting blend was mixed for about 2 to about 5 minutes at a temperature of about 160° F. The syrup, glycerin and first portions of the sugar and dextrose monohydrate were added. With the second and final addition of the sugar and dextrose monohydrate, the flavor was added. The batch mix time was about 9 minutes. The resulting chewing gum had good texture and clean, non-rancid flavor. Thus, even an aged batch of HFO base beginning to manifest signs of deterioration can be used to yield an organoleptic acceptable chewing gum when the gum is made according to the method of the present invention.

Example 4

A chewing gum having the formulation provided below was prepared in accordance with the present invention.

|  |  |
|---|---|
| Molten Conventional Base[4] | 18.80% |
| HFO Base[5] | 5.20% |

-continued

|  |  |
|---|---|
| Sugar | 53.18% |
| Dextrose Monohydrate | 13.40% |
| Glycerin | 0.89% |
| 10% Salt Solution | 0.10% |
| 43 Be [Baume?] Corn Syrup | 7.00% |
| Encapsulated Aspartame | 0.08% |
| Spearmint Flavor | 1.35% |
|  | 100.00% |

[4]The molten low fat base had the following formulation: microcrystalline wax (82° C. melting point) (9.9%); Paraffin Wax (46° C. melting point) (0.7%); terpene resin (85° C. softening point) (18.6); natural gums (4.9%); rosin esters (2.0%); glycerol monostearate (3.6%); hydrogenated cottonseed oil (1.9%); hydrogenated soybean oil (0.4%); lecithin (1.1%); low molecular weight polyvinyl acetate (24.2%); polyisobutylene (2.2%); isoprene-isobutylene copolymer (8.3%); calcium carbonate (20.75%); cocoa powder (0.43%); BHT (0.02%).
[5]The same HFO base formulation used in Example 1.

The molten low fat base was added to the mixer at a temperature of about 217° F. The HFO gum base and the 10% salt solution, both having temperatures of about 72° F., were then added to the mixer. One-third of the total sugar, having a temperature of about 89° F. was then added. The ingredients were mixed for about 2 minutes and had a resulting temperature of about 157° F. The dextrose monohydrate, having a temperature of about 72° F. was then added and mixed for about 3 minutes, causing the temperature of the mixture to lower to about 130° F. The 43 Be Baume corn syrup, having a temperature of about 104° F., and the glycerin, having a temperature of about 72° F., were then added and mixed for about 1 minute. Another one-third of the total sugar, having a temperature of about 19° F., and the encapsulated Aspartame, havinq a temperature of about 72° F., were then added and mixed for about 2 minutes, causing the temperature of the mixture to lower to about 120° F. Finally, the remaining one-third of the total sugar, having a temperature of about 89° F., and the flavor, having a temperature of about 72° F., were added and mixed for about 4.5 minutes. The final temperature was about 120° F.; the total mix time was about 12.5 minutes; and the chewing gum was free of unincorporated HFO cold base. The resulting chewing gum had good texture, stability and flavor. The base blend of this example is the presently most preferred embodiment of this invention.

Example 5

A chewing gum having the formulation as in Example 4 was prepared in accordance with the present invention.

The molten low fat base was added to the mixer at a temperature of about 228° F. The HFO gum base having a temperature of 72° F. was then added to the mixer. Two-thirds of the sugar (about 52% of the total bulking agent), having a temperature of about 94° F. was then added to the mixer and mixed for 4 minutes. No temperature was taken, but seemed to be about 100°-160° F. Next was added 43 Be corn syrup having a temperature of about 98° F., glycerin, dextrose monohydrate, and encapsulated Aspartame, all having a temperature of about 72° F. and mixed for 1 minute. No gum temperature was taken. The final one-third sugar and flavor was then added and mixed for 5 minutes with the 10% salt solution added 2 minutes into the final 5 minute mix. The final gum temperature was 122° F. and had a total mix time of 10 minutes. The chewing gum was free of unincorporated HFO cold base and gave a chewing gum with good texture, stability and flavor.

It is to be understood that an equivalent of changes and modifications of the embodiments described above are also contemplated by the present invention. The following examples are is not to be construed as a limitation upon the present invention, but are is included merely as an illustration of various embodiments an embodiment.

I claim:

1. A method of manufacturing a chewing gum comprising the following steps:
   a) in a first mixing step mixing until homogenous an amount of a low fat gum base having a premix temperature of about 200-240° F., an amount of HFO gum base having a premix temperature of about 60-80° F. and an amount of a bulking agent to yield a gum base blend; and
   b) in a final mixing step mixing with the gum base blend an amount of flavor and an amount of bulking agent.

2. The method of claim 1 wherein the HFO gum base comprises:
   about 5-30 wt % filler;
   about 10-40 wt % low molecular weight polyvinyl acetate;
   about 20-40 wt % elastomers; and
   about 20-50 wt % fat and oil.

3. The method of claim 2 wherein the low fat gum base comprises:
   about 15-50 wt % elastomers;
   about 10-50 wt % resins;
   about 1-15 wt % wax;
   about 5-50 wt % filler; and
   about 1-15 wt % of a oomponent selected from the group consisting of fats, oils and mixtures thereof.

4. The method of claim 3 wherein the bulking agent is selected from the group consisting of sugar sweeteners, sugarless sweeteners and mixtures thereof.

5. The method of claim 4 wherein subsequent to the first mixing step and prior to the final mixing step chewing gum ingredients are mixed with the base blend.

6. The method of claim 5 wherein the chewing gum ingredients are selected from the group consisting of softeners, sweeteners, flavoring agents, colors, emulsifiers, pharmaceutical agents and mixtures thereof.

7. A method of making a chewing gum comprising the following steps:
   a) in a first mixing step mixing until homogenous an amount of a low fat gum base having a premix temperature of about 200°-240° F., an amount of HFO gum base having a premix temperature of about 60-80° F. and about 30-60 wt % of the total bulking agent contemplated for use in the final chewing gum product to yield a gum base blend;
   b) mixing the gum base blend with an amount of dextrose monohydrate for about 2.5-3.5 minutes;
   c) mixing with the gum base blend for about 0.5-1.5 minutes a component selected from the group consisting of softeners, sweeteners, colors, emulsifiers, pharmaceutical agents and mixtures thereof;
   d) mixing with the gum base blend for about 1.5-2.5 minutes about 20-40 wt % of the total bulking agent contemplated for use in the final chewing gum product; and
   e) in a final mixing step mixing the gum base blend for about 4-5 minutes with the flavor and the remaining portion of the bulking agent.

8. The method of claim 7 wherein the HFO gum base comprises:
   about 5-30 wt % filler;
   about 10-40 wt % low molecular weight polyvinyl acetate;
   about 20-40 wt % elastomer; and
   about 20-50 wt % of a component selected from the group consisting of fats, oils and mixtures thereof.

9. The method of claim 8 wherein the conventional low fat gum base comprises:
   about 15-50 wt % elastomer;
   about 10-50 wt % resin;
   about 1-15 wt % wax;
   about 5-50 wt % filler; and
   about 1-15 wt % of a component selected from the group consisting of fats, oils and mixtures thereof.

10. A method of manufacturing a chewing gum comprising the following steps:
    a) in a first mixing step mixing until homogenous an amount of a non-tack gum base having a premix temperature of about 200°-240° F., an amount of HFO gum base having a premix temperature of about 60-80° F. and an amount of the bulking agent to yield a gum base blend;
    b) in a final mixing step mixing with the gum base blend flavor and an amount of bulking agent.

11. The method of claim 10 wherein the HFO gum base comprises:
    about 5-30 wt % filler;
    about 10-40 wt % low molecular weight polyvinyl acetate;
    about 20-40 wt % elastomers; and
    about 20-50 wt % of a component selected from the group consisting of fats and oils and mixtures thereof.

12. The method of claim 11 wherein the non-tack gum base comprises:
    about 1-20 wt % high melting wax;
    terpene resin in an amount up to about 40 wt %;
    low melting wax in an amount up to about 4 wt %;
    about 1-15 wt % oil;
    low molecular weight polyvinyl acetate in an amount up to about 40 wt %;
    about 0.5-50 wt % inorganic filler;
    lecithin in an amount up to about 5 wt %;
    polyisobutylene in an amount up to about 20 wt %; and
    isoprene-isobutylene copolymer in an amount up to about 20 wt %.

13. The method of claim 12 wherein the bulking agent is selected from the group consistinq of sugar sweeteners, sugarless sweeteners and mixtures thereof.

14. The method of claim 13 wherein subsequent to the first mixing step and prior to the final mixing step the gum base blend is mixed with chewing gum ingredients.

15. The method of claim 14 wherein the chewing gum ingredients are selected from the group consisting of dextrose monohydrate, glycerine, sweeteners, flavoring agents, colors, emulsifiers, pharmaceutical agents and mixtures thereof.

16. A method of making a chewing gum comprising the following steps:
    a) in a first mixing step mixing until homogenous an amount of non-tack gum base having a premix temperature of about 200°-240° F., an amount of an HFO gum base having a premix temperature of about 60°-80° F. and about 20-40 wt % of the total bulking agent contemplated for use in the final chewing gum product to yield a gum base blend;

b) mixing the gum base blend with dextrose monohydrate for about 2.5-3.5 minutes;
c) mixing with the gum base blend for about 0.5-1.5 minutes a component selected from the group consisting of glycerine, sweeteners, colors, emulsifiers, pharmaceutical agents and mixtures thereof;
d) mixing with the gum base blend for about 1.5-2.5 minutes about 20-40 wt % of the total bulking agent contemplated for use in the final chewing gum product; and
e) in a final mixing step mixing the gum base blend for about 4-5 minutes with flavor and the remaining portion of the bulking agent.

17. The method of claim 16 wherein the HFO gum base comprises:
about 5-30 wt % filler;
about 10-40 wt % low molecular weight polyvinyl acetate;
about 20-40 wt % elastomer; and
about 20-50 wt % of a component selected from the group consisting of fats, oils and mixtures thereof.

18. The method of claim 17 wherein the non-tack base comprises:
about 1-20 wt % high melting wax;
terpene resin in an amount up to about 40 wt %;
low melting wax in an amount up to about 4 wt %;
about 1-15 wt % oil;
low molecular weight polyvinyl acetate in an amount up to about 40 wt %;
about 0.5-50 wt % inorganic filler;
lecithin in an amount up to about 5 wt %;
polyisobutylene in an amount up to about 20 wt %; and
isoprene-isobutylene copolymer in an amount up to about 20 wt %.

19. The method of claim 18 wherein an aqueous salt solution is added to the gum base blend.

* * * * *

UNITED STATES PATENT AND TRADEMARK OFFICE
CERTIFICATE OF CORRECTION

PATENT NO. : 5,192,562
DATED : March 9, 1993
INVENTOR(S) : Ronald T. Grey et al.

It is certified that error appears in the above-indentified patent and that said Letters Patent is hereby corrected as shown below:

Column 10, line 31, please delete "19°" and substitute therefor --89°--.
Column 11, line 4, please delete "is".
Column 11, line 5, please delete "is".
Column 11, lines 6-7, please delete "an embodiment".

Column 11, line 8, please delete "I" and substitute therefor --We--.

Signed and Sealed this

Twenty-third Day of August, 1994

Attest:

BRUCE LEHMAN

Attesting Officer      Commissioner of Patents and Trademarks